(12) United States Patent
Bailey et al.

(10) Patent No.: US 10,817,924 B2
(45) Date of Patent: Oct. 27, 2020

(54) METHOD, MEDIUM, AND SYSTEM FOR ORDERING USING A WEARABLE DEVICE

(71) Applicant: OCADO INNOVATION LIMITED, Hatfield, Hertfordshire (GB)

(72) Inventors: Clifford Bailey, Hatfield (GB); Tamique Weekes, Hatfield (GB); James Dimmock, Hatfield (GB); Kim Mann, Hatfield (GB); Tomos Brennan, Hatfield (GB)

(73) Assignee: OCADO INNOVATION LIMITED, Hatfield, Hertfordshire (GB)

( * ) Notice: Subject to any disclaimer, the term of this patent is extended or adjusted under 35 U.S.C. 154(b) by 448 days.

(21) Appl. No.: 15/549,062

(22) PCT Filed: Feb. 8, 2016

(86) PCT No.: PCT/EP2016/052655
§ 371 (c)(1),
(2) Date: Aug. 4, 2017

(87) PCT Pub. No.: WO2016/124796
PCT Pub. Date: Aug. 11, 2016

(65) Prior Publication Data
US 2018/0247366 A1 Aug. 30, 2018

(30) Foreign Application Priority Data

Feb. 6, 2015 (GB) .................................... 1502045.6
Mar. 23, 2015 (GB) .................................... 1504886.1

(51) Int. Cl.
*G06Q 30/00* (2012.01)
*G06Q 30/06* (2012.01)
(Continued)

(52) U.S. Cl.
CPC ..... *G06Q 30/0633* (2013.01); *G06F 15/0208* (2013.01); *G06Q 10/083* (2013.01); *G06Q 30/01* (2013.01); *G06Q 30/0641* (2013.01)

(58) Field of Classification Search
CPC .......... G06Q 30/0633; G06Q 30/0641; G06Q 30/01; G06Q 10/083; G06F 15/0208
See application file for complete search history.

(56) References Cited

U.S. PATENT DOCUMENTS 7,797,201 B2 9/2010 Mori et al.
7,860,738 B2 * 12/2010 Simon .............. G06Q 10/06311
705/7.13

(Continued)

OTHER PUBLICATIONS

De, Prabuddha, Jay B. Ghosh, and Charles E. Wells. "Optimal delivery time quotation and order sequencing." Decision Sciences 22.2 (1991): 379-390. (Year: 1991).*

(Continued)

*Primary Examiner* — Matthew E Zimmerman
(74) *Attorney, Agent, or Firm* — Buchanan Ingersoll & Rooney PC

(57) ABSTRACT

A grocery ordering system is disclosed in which a customer can place an order for delivery in a single click or touch. The system can be configured to run on a device with limited screen size such as a watch or a small-screened handheld device. As the screen size of the device may be limited the order can be placed and the delivery time and day allocated in as few screens or menus as possible. A customer can place an order in a single step, as the customer's previous orders and delivery slots are used to allocate an order and delivery time based on a preferred list of goods to order and a likely acceptable delivery slot. The delivery slot is calculated to allow sufficient time for the customer to amend their order on a device with a larger screen size or improved processing power.

11 Claims, 6 Drawing Sheets

(51) Int. Cl.
    *G06Q 10/08*     (2012.01)
    *G06F 15/02*     (2006.01)

(56) References Cited

U.S. PATENT DOCUMENTS

| | | | |
|---|---|---|---|
| 7,870,036 B2 | 1/2011 | Mori et al. | |
| 8,370,271 B1* | 2/2013 | Robinson | G06Q 10/083 |
| | | | 705/26.7 |
| 2002/0072994 A1 | 6/2002 | Mori et al. | |
| 2006/0212365 A1 | 9/2006 | Mori et al. | |
| 2008/0015951 A1* | 1/2008 | Kerker | G06Q 30/0201 |
| | | | 705/7.29 |
| 2008/0059334 A1 | 3/2008 | Mori et al. | |
| 2014/0136443 A1* | 5/2014 | Kinsey, II | G06Q 30/0627 |
| | | | 705/347 |
| 2014/0279188 A1* | 9/2014 | Powell | G06Q 30/0631 |
| | | | 705/26.7 |
| 2015/0049591 A1* | 2/2015 | Adams | G04G 21/04 |
| | | | 368/13 |
| 2015/0193784 A1* | 7/2015 | Gao | G06Q 30/0619 |
| | | | 705/7.29 |

OTHER PUBLICATIONS

International Preliminary Report on Patentability (Form PCT/IB/373) dated Aug. 8, 2017, by the International Bureau of WIPO for International Application No. PCT/EP2016/052655.

International Search Report (PCT/ISA/210) dated May 19, 2016, by the European Patent Office as the International Searching Authority for International Application No. PCT/EP2016/052655.

Written Opinion (PCT/ISA/237) dated May 19, 2016, by the European Patent Office as the International Searching Authority for International Application No. PCT/EP2016/052655.

\* cited by examiner

Notification example - Order status

Notification example - Voucher messages

METHOD, MEDIUM, AND SYSTEM FOR ORDERING USING A WEARABLE DEVICE

The invention relates to a device, system and method for online ordering. More specifically, but not exclusively it relates to a system and method for predictively selecting a customer's order and desired time slot for a delivery within an online grocery or goods delivery system.

This application claims priority from UK Patent Application No GB1502045.6 filed on 6 Feb. 2015 and UK Patent Application No GB1504886.1 filed on 23 Mar. 2015 the entire content of which is hereby incorporated by reference.

In online shopping systems, features exist where, for example, a customer's likely shopping requirements are predicted based on an account history or previous shopping habits. For example, certain online retailers will automatically fill a virtual basket with favourite goods. This favourite list is a smartly built list of products that is created based on the customer's previous purchases.

With the advance in ever smaller mobile telecommunications devices, such as the Apple iWatch™, customers are increasingly wanting to use online shopping websites whilst on the move. As these devices may have limited screen size, processing power, ROM or RAM it is advantageous to have programs or applications that are capable of running on such devices. This may require only certain functions to run on the device or may require simplified user interaction, for example a single touch or click rather than numerous user interactions requiring complex menu structures.

In the case of a grocery ordering and delivery system, it would, therefore, be advantageous to predict a customer's desired order and delivery slot time for the goods to enable a one touch 'instant order' thereby re-ordering and selecting delivery based on previous selections and criteria made by the customer.

According to the invention there is provided a method of delivery slot allocation for a customer placing an order for goods comprising the steps of: (a) establishing the date and time of the customer's previous order; (b) allocating the delivery day of the future order by allocating the similarly named day of the customer's previous order within the next week; (c) allocating the delivery time of the future order by allocating a time slot substantially the same as that of the customer's previous order; and (d) allocating said day and time delivery slot to the customer's future order.

According to the invention there is further provided a system of delivery slot allocation for a customer placing an order for goods, the system comprising a portable mobile communications device, the device comprising a communications module, an application and a user interface, the user interface comprising means for placing an order for goods via the application, the user interface being further provided with means for allocating a day and time for delivery of the order based on the customer's previously selected day and time of delivery.

According to the invention there is further provided a device for wearing on a user's wrist, the device comprising one or more computer means, the computer means being configured to execute instructions, the instructions when executed providing; one or more utilities communicating over a mobile communications network for performing tasks as required by the user wherein one of the tasks provided for allows the user to purchase goods or services from a predetermined supplier using suitable user interface means operable on the device.

According to the invention there is further provided a method of ordering goods or services comprising the steps of selecting and reserving goods via a user worn device, identifying a suitable delivery date, and paying for the goods or services, in which the identification of the suitable delivery date is achieved via communication between the device and a central data processing system located remote from the user.

In this way, a device with a small screen and limited processing power may be used to perform more complicated online ordering tasks more commonly associated with larger more powerful devices.

The invention will now be described with reference to the attached diagrammatic drawings in which.

Figure 1:
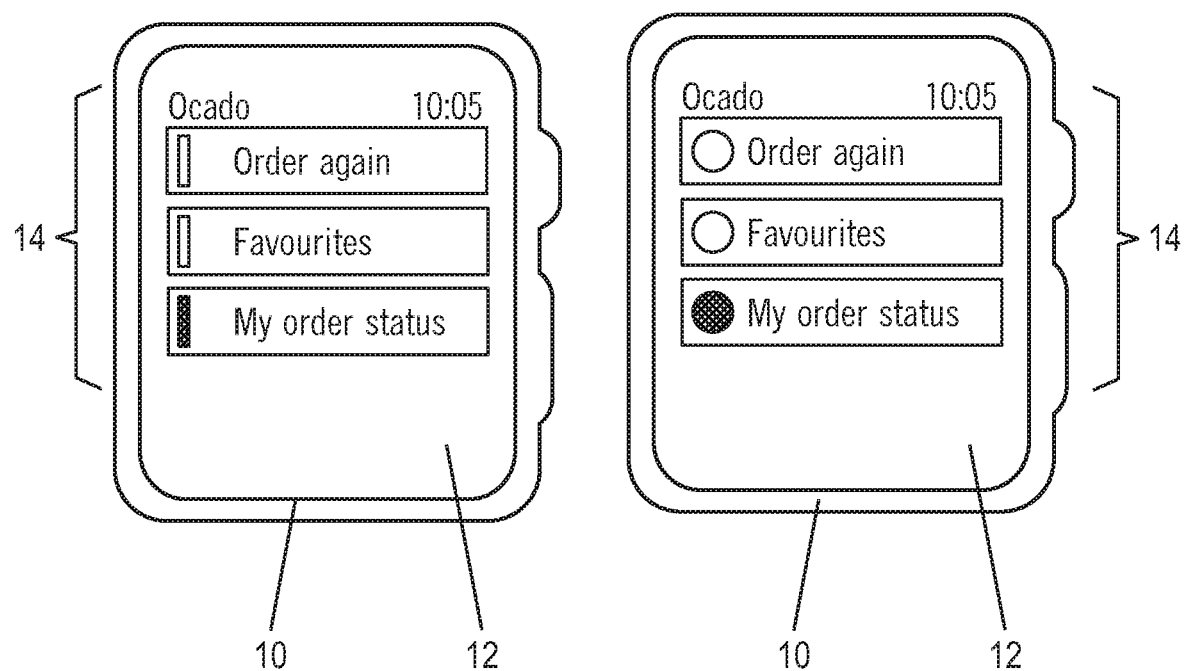
FIG. 1 is a schematic diagram of a device showing an online ordering and delivery application in accordance with one form of the invention in use on a wearable mobile device.
Figure 5:
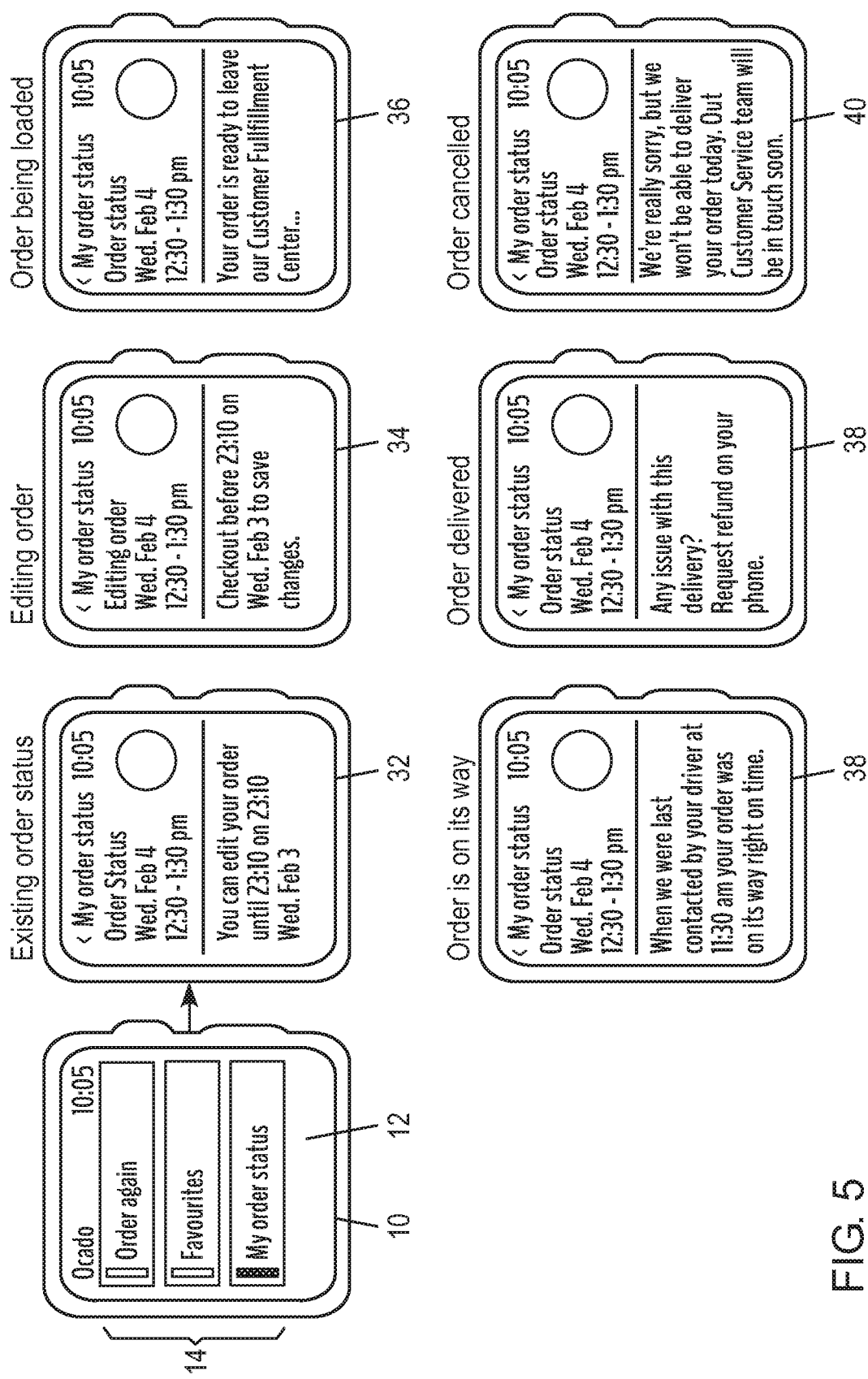
Figure 6A:
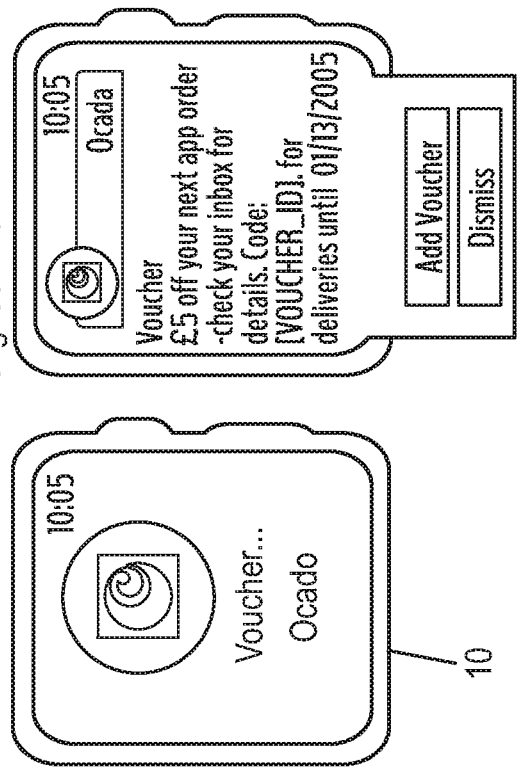
Figure 6B:
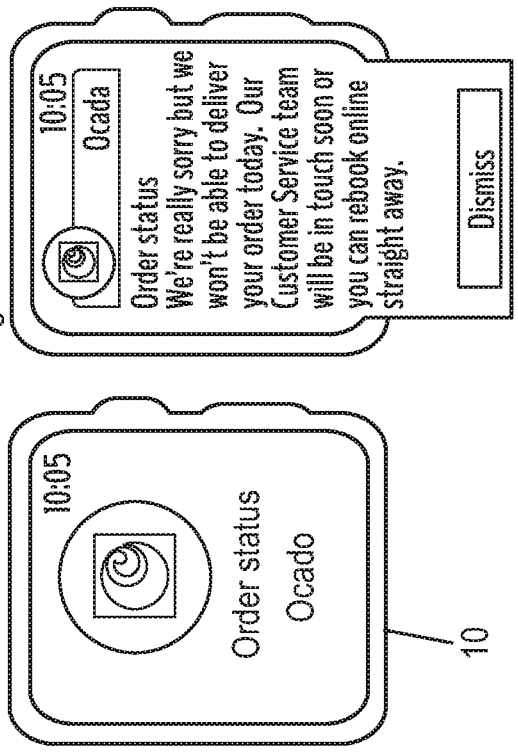

FIG. 5 is a schematic diagram of the device of FIG. 1 showing a series of screenshots in accordance with one form of the invention, where the device may be used to check the status of an order or view special offers available; and FIGS. 6a and 6b are schematic diagrams of the device of FIG. 1 showing a series of screenshots in accordance with one form of the invention, showing alternative views or notifications available on the screen of the device.

The system described below enables online ordering and delivery slot time allocation for an online ordering system on a device with limited screen space.

FIG. 1 shows an outline of such a device 10, showing an example home page 12 for an online grocery shopping application. The device 10 comprises at least one utility capable of operation on the device. The utilities take the form of software operable on the device, the or each utility comprising a graphical user interface 14 and further comprising means for receiving signals relating to inputs from the user, the user being able to select from a number of options by touching the screen of the device.

In a first embodiment of the invention, a first utility comprises means enabling the user to re-order a previous selection of items, a second utility comprises means enabling the user to order a selection of predetermined items according to a shopping history, the shopping history defining a series of favourite items known as 'favourites' and a third utility comprising means for displaying information relating to orders placed.

Figure 2:
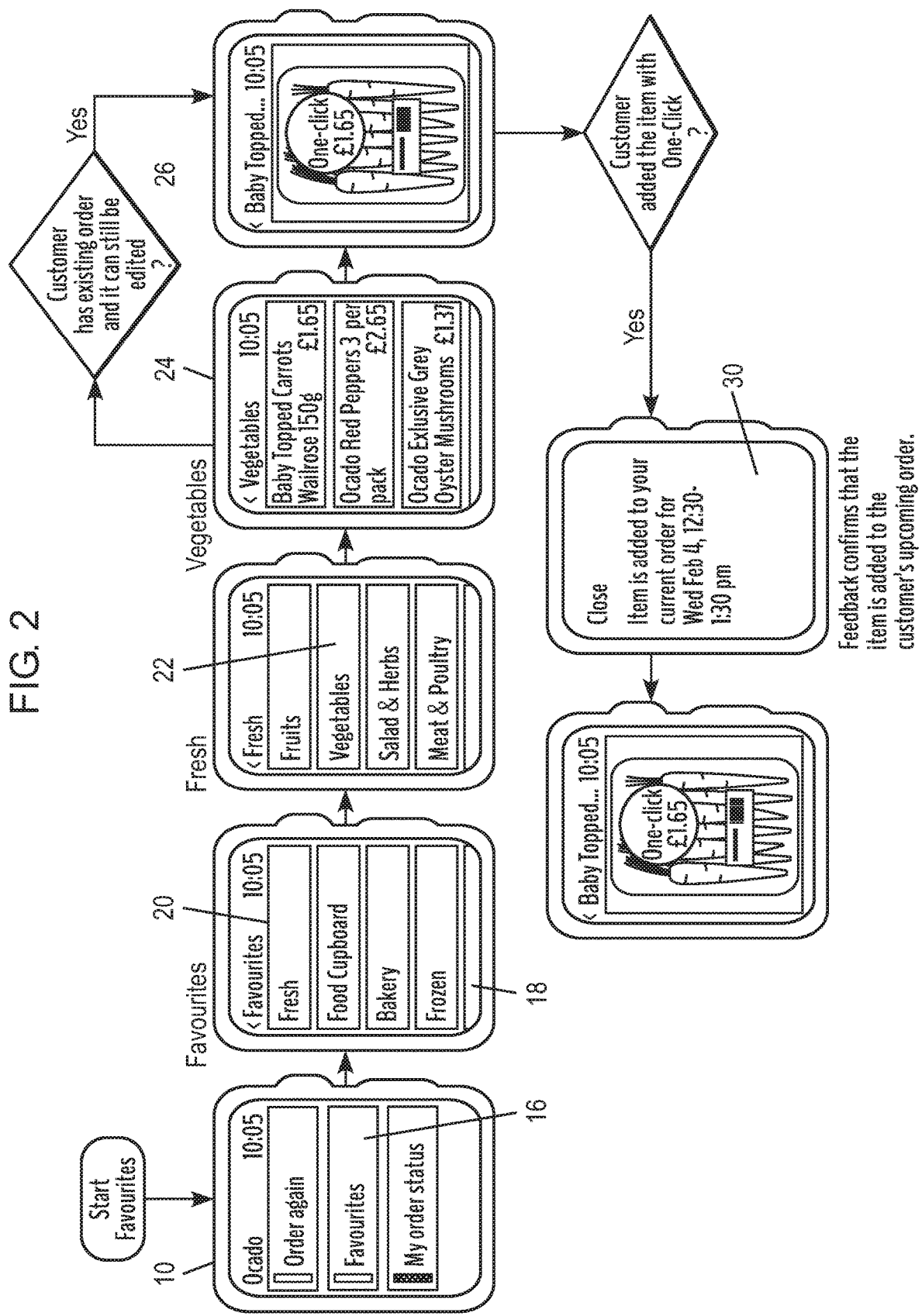
FIG. 2 is a schematic diagram of the device of FIG. 1 showing a series of screenshots in accordance with one form of the invention, where the device may be used to add to an order already placed previously either on the device or on an alternative device, the user being able to add items without going through a checkout process again.

FIG. 2 shows a flow diagram of decisions or inputs required by the utility in order to enable a user to add a historically ordered item to a pre-existing order. The system operable on the device 10 starts at the home screen 12. The user selects 'favourites' 16 from the on-screen display and is taken to a next screen 18 giving options from which to select. Depending on the item the user wishes to add to their order, the correct sub-set of items is selected, in this example, if the user wishes to add carrots the 'fresh' 20 would be selected. It is advantageous to divide all purchasable items or previously ordered items in to groups and to attach a identifying label to the subset to prevent a long list of items from being displayed on the screen and requiring the user to scroll through to find the required item. In a similar manner, the user is then directed to a further screen where, if carrots are to be added 'vegetables' 22 should be selected by the user. Once the selections result in a sufficiently small selection of appropriate items a list 24 may be displayed. The user selects the required item from the list and the utility communicates via suitable communicating means (not shown) with a centralised, online ordering system operated by, in this example, the grocery provider to establish if it is possible to add the item to the existing order placed by the user. If the item 26 may be added, the user is invited to confirm via an input on the graphical user interface and the utility adds the item 26 to the user's online order held on the grocery provider's online ordering system. A confirmation screen 30 is displayed confirming that the required item 28 has been added to the existing order.

It will be appreciated that as in the above example, the user is adding an item to a pre-existing order, there is no requirement for the user to go through a checkout procedure. This is as the user will have been required to undertake a checking out and paying action on placing the original order. It will further be appreciated that the option of adding items to a pre-existing order may only be available if a predetermined cutoff time prior to the delivery of the order has not yet been reached. In the event that the cutoff time has been exceeded, a message will be displayed indicating as such to the user.

It will be appreciated that the original order need not have been placed on the device of FIG. 1, any suitable device may have been used to place the original order.

Figure 3:
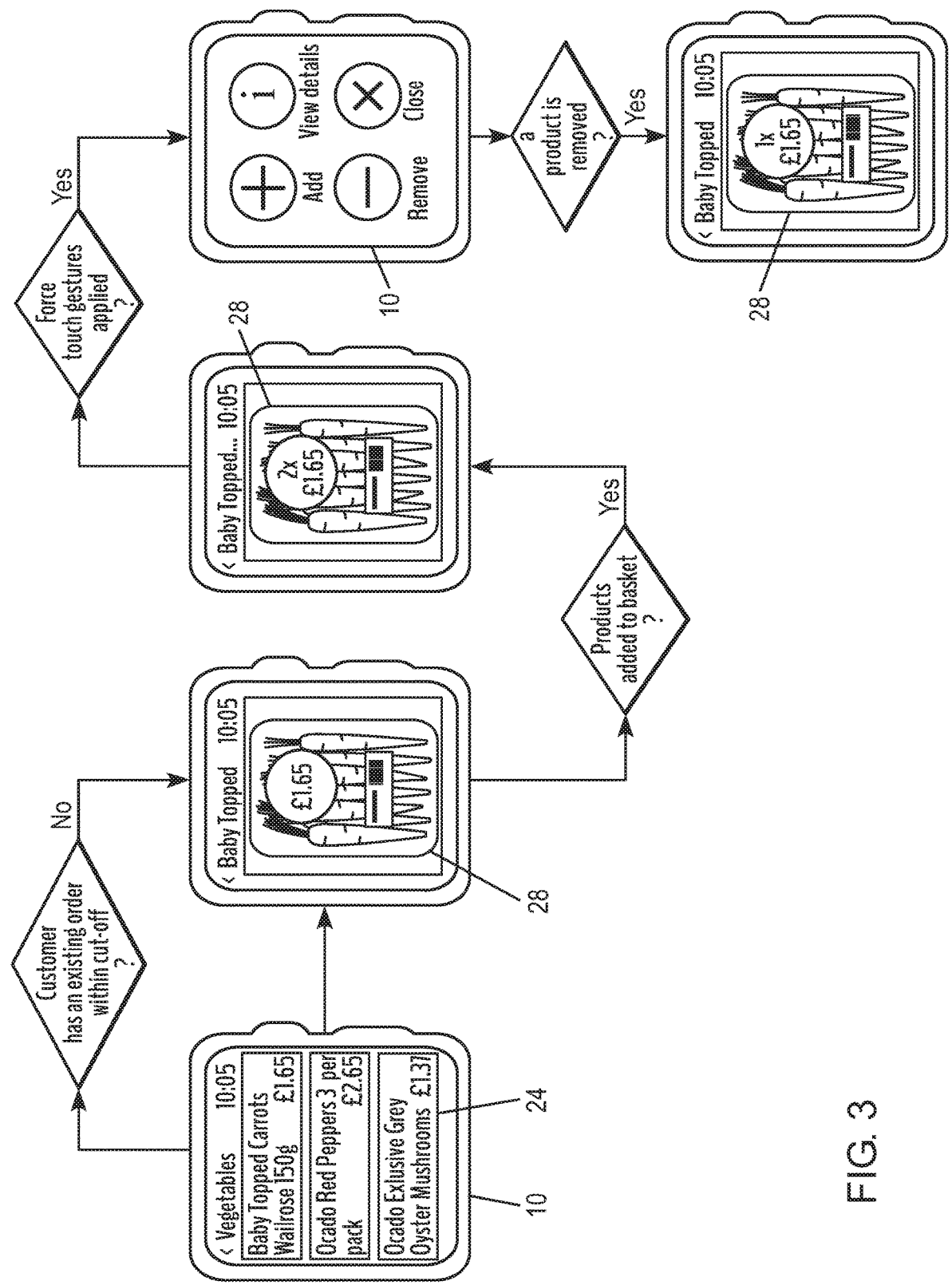
FIG. 3 is a schematic diagram of the device of FIG. 1 showing a series of screenshots in accordance with one form of the invention, where the device may be used to create an order by adding an item to a virtual shopping trolley.
Figure 4:
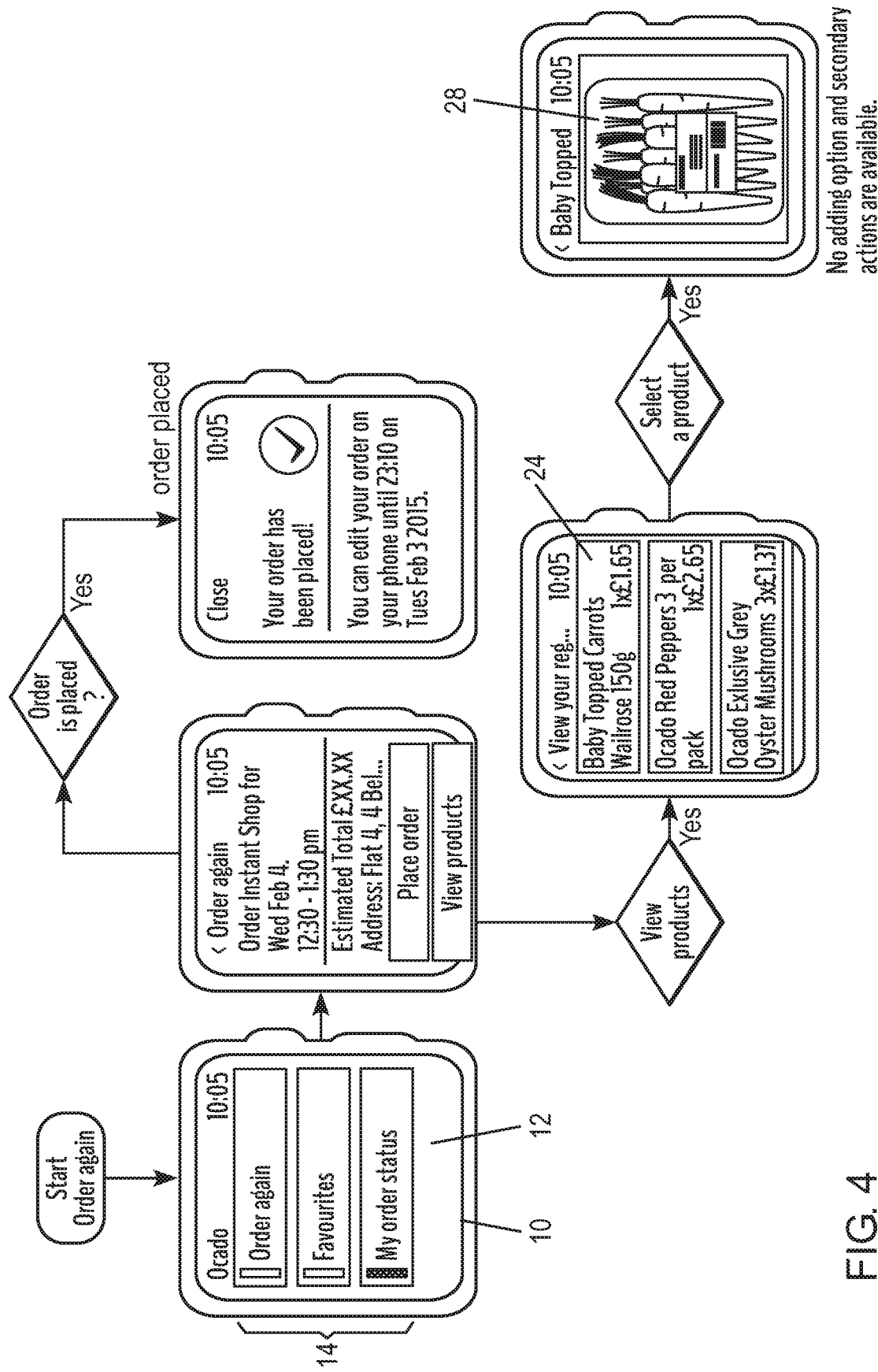
FIG. 4 is a schematic diagram of the device of FIG. 1 showing a series of screenshots in accordance with one form of the invention, where the device may be used to create and place an order and allocate a delivery time slot based on the user's previous shopping history and shopping behaviours.

In a second embodiment of the invention, as described below with reference to FIG. 3, a user wishes to order an item 28. In this example, the user will follow the example above with reference to FIG. 2 and will locate the desired item 28. Once the item 28 is located by the user, the utility communicates via suitable communicating means (not shown) with a centralised, online ordering system operated by, in this example, the grocery provider to add the item 28 to a virtual shopping trolley or cart. If the item 28 is available and can be added to the trolley, the user will be required to confirm via a touch gesture on the display 12 of the device 10. It will be appreciated that a user may subsequently be able to remove the item 28 from the virtual shopping trolley via suitable inputs using the touch screen, and as shown in FIG. 3.

In a further embodiment of the invention, it is possible for a user to place an order using an 'instant shop' option. In this embodiment, a system generated order is compiled via a further utility. The further utility reviews the user's previous shopping behaviours including establishing items ordered, numbers of items ordered, frequency of items ordered, types of items ordered (such as baby products, organic products, vegetarian products for example only) and seasonal items (for example items purchased only at Christmas or Easter for example).

Once the utility compiles an 'instant order' shop, it is automatically added to the virtual shopping trolley via the online ordering system and all the user is required to do is to checkout. As described in more detail below, the 'instant shop' order would also allocate a delivery slot to the order, requiring the user to confirm the acceptability of the slot allocated.

In a further embodiment of the invention, a utility is provided comprising means for allocating delivery slots to orders placed via the device of FIG. 1.

In this method of delivery slot selection, the system predicts when a customer will next want their delivery based on their last delivery slot for their last delivered order and automatically selects the same delivery day and slot in a subsequent week for them, if it is available. If the delivery slot is not available, the system will choose the next closest delivery slot available.

Once the user has indicated a requirement for an order to be placed and delivered the device communicates with the server via suitable communication means to request the dates/times of one or more "Instant Slot" delivery date/time combinations for display to the user.

The Instant Slot delivery times may be calculated by a probability estimation algorithm that rates and sorts into rank order candidate delivery slot times taking into account information about the customer, such as the following:

(a) patterns inferred from the times, days and dates of previous deliveries
(b) other information about the user; for example:
  i. information in the user's calendar (e.g. times/dates when the user is out at a location away from home)
  ii. information in other user's calendars (e.g this user is a guest in another user's meeting at a location away from the first user's house)
  iii. information inferred from online sources (e.g. the user's linkedin profile shows them to be an office worker so it is unlikely that they can normally be home to accept deliveries between 9 am to 5 pm each day)
  iv. information inferred from items the user uses (e.g. the user's car typically arrives home each day at 5 pm; the user's credit card or Oyster card typically shows that the user gets on the tube at 5 pm each weekday and gets off at their home station at 6 pm each weekday; the user's intelligent kettle is usually used at 6.05 pm is evening)
(c) previous responses to requests to accept or reject Instant Slot delivery slots
(d) information about the user's delivery address (e.g. known or accessible electronic internet of things information is that the lights are normally on from 8 pm in the evening and the door is normally unlocked at 8 pm each day but locked from 10 am to 8 pm; the Nest thermostat is set to warm the house up by 8 pm each evening).

It will be appreciated that in order to monitor a user's movements to this extent permissions will need to be granted by the user when an online account is set up.

The user is presented with one or more candidate slots, which the user can reject or accept; or the user can request further candidate slots. Further candidate delivery slots can be requested by "earlier", "later" or "the likely next most convenient slot"

The method of delivery time slot selection follows the following steps:

Based on the date of the last delivered order, a delivery time slot in the future is selected, the same weekday is selected and closest time to the previously delivered order is requested; the delivery slot is booked for delivery to the user's default delivery address; the delivery slot selection is always at least two days in the future, giving the user enough time to be able to edit their order or time slot on the or an alternative device, in which the other device is running a fuller version of any shopping software or an improved and more detailed graphical user interface (GUI).

A worked example will now be given. It will be appreciated that the worked example is an exemplary embodiment of the invention only, the dates and times used have no specific meaning, they are simply used to show the rules applied by the system using the invention.

A user has received a completed and delivered order on Tuesday $10^{th}$. The same user wishes to place an order using their iWatch. When the customer places an 'instant order' using a single click or touch, the system attempts to reserve a time delivery slot on Tuesday $17^{th}$. If the current date is 15th or earlier, Tuesday $17^{th}$ will be allocated. However, if the current date is 16th or 17th, the instant order slot is pushed to Tuesday 24th. If the customer already has a booked slot on the day selected, then the delivery slot selection will be pushed one day in the future, to the $25^{th}$ in this example.

Once the delivery day slot is established and allocated by the system, the time delivery slot is allocated. If the user's previous delivery was delivered between 2.00 pm and 3:00 pm the same time slot will be allocated if it is available. If this time slot is not available, the system will allocate the next nearest time slot available on the previously allocated day, taking in to account information established such as but not limited to that listed above.

If the user does not want the delivery day or time slot allocated by the system, the user must change the allocation on an alternative device having full functionality, such as an application on an iPhone or via web access on a PC or other computing device.

It will be appreciated that the user needs to have placed and received at least one delivered order. Additionally, the customer must have a default delivery address logged in their account or within the system. Furthermore, the user must have stored payment details.

It will be appreciated that the time slot allocation algorithm described above is one of any number of ways that a time slot may be allocated. It is important to note that a method of optimal date selection is used, based on analysis of the user's shopping patterns.

In this way, delivery day and time slot selection will make it quicker and simpler for a user to checkout an order. Such an order can be completed without having to go through time and day delivery slot booking pages in a full application. (Selecting a date, an address etc) The products or goods in the shopping list are smartly selected according to the customer's previous shopping behaviour, and the time and day delivery slot is selected based on their last order.

As shown in FIG. 5, it is possible for the user to edit an existing order from the touch screen face 12 of the device 10. From the home screen the user selects 'order status' from the list of options 14, by touching the relevant portion of the screen. A series of screens may be displayed. These may include, but not be limited to, details of the order placed 32, details of the time slot allocated or selected, details of the progress of the order 36 or the delivery 38, details of any cancellation of the order 40, details of any substitutions to the order being delivered or suggested.

FIGS. 6a and 6b show alternative messages that may be displayed on the device and the format in which the space on the display may be utilized. The device may be used to display order updates or notifications to advise the user of changes to the status of the order, such as those described above. Alternatively the device may be used to display vouchers or special offers for the user. These may be targeted offers or vouchers based on the user's shopping behaviour, purchases or seasonal offers.

The screen may in the first instance display a notification that may be expanded by the user touching the notification display.

It will be appreciated that using the above-mentioned system and method, all the customer will have to do to complete their order on their iWatch is click a 'Place Order' button.

It will be appreciated that the system need not be limited to grocery shopping but may be adapted to any form of online shopping scenario as required.

It will be appreciated that whilst the invention is described with reference to Apple™ devices, the system and method is equally applicable to other devices running alternative operating systems such as Android™.

The invention claimed is:

1. A method of delivery slot allocation for a customer placing an order for goods comprising:
   (a) establishing, via a utility operable on a wearable processing device on a wrist of the customer, dates and times of a customer's previous deliveries and dates and times associated with one or more electronically recorded activities associated the customer;
   (b) calculating, via probability estimation algorithm of the wearable processing device, candidate delivery slot days and times for delivery of the customer's future order based on the customer's previous deliveries and the one or more electronically recorded activities associated with the customer;
   (c) allocating, via the utility operable on the wearable processing device, a delivery day of a future order based on a ranking of the delivery slot days;
   (d) allocating, via the utility operable on the wearable processing device, a delivery time of the future order based on a ranking of the candidate delivery times; and
   (e) allocating electronically, via the utility operable on the wearable processing device, said day and time delivery slot to the customer's future order based on a selection by the customer through a graphical user interface on the wearable processing device.

2. A method according to claim 1, comprising:
   (f) allocating the delivery day of the future order by allocating from the ranked candidate delivery times the similarly named day of the customer's previous order in a subsequent week if the day allocated in (b) falls within a predetermined number of days of a date on which the customer is placing an order.

3. A method according to claim 2 in which the predetermined number of days is two days.

4. A method according to claim 2, comprising:
   (f) ordering a predetermined number of goods based on a customer's previously ordered goods, for delivery in the day and time slot allocated.

5. The method according to claim 1, wherein the one or more electronically recorded activities include at least one of: electronic calendar events associated with the user, electronically recorded travel events associated with the user, electronic payment transactions associated with the user, and electronically recorded home appliance events associated with the user.

6. A system for delivery slot allocation for a customer placing an order for goods comprising:
   a wearable processing device for wearing on a wrist of the customer, the wearable processing device having one or more utilities, which when executed, cause the wearable processing device to:

(a) establish dates and times of a customer's previous deliveries and dates and times associated with one or more electronically recorded activities associated the customer;
(b) calculate, via a probability estimation algorithm, candidate delivery slot days and times for delivery of the customer's future order based on the customer's previous deliveries and the one or more electronically recorded activities associated with the customer;
(c) allocate a delivery day of a future order based on a ranking of the delivery slot days;
(d) allocate a delivery time of the future order based on a ranking of the candidate delivery times; and
(e) allocate electronically said day and time delivery slot to the customer's future order based on a selection by the customer through a graphical user interface on the wearable processing device.

7. The system according to claim 6, wherein the one or more utilities, when executed, cause the wearable processing device to:
(f) allocate the delivery day of the future order by allocating from the ranked candidate delivery times the similarly named day of the customer's previous order in a subsequent week if the day allocated in (b) falls within a predetermined number of days of a date on which the customer is placing an order.

8. The system according to claim 7 in which the predetermined number of days is two days.

9. A system according to claim 7, wherein the one or more utilities, when executed, cause the wearable processing device to:
(g) order a predetermined number of goods based on a customer's previously ordered goods, for delivery in the day and time slot allocated.

10. The system according to claim 6, wherein the one or more electronically recorded activities include at least one of: electronic calendar events associated with the user, electronically recorded travel events associated with the user, electronic payment transactions associated with the user, and electronically recorded home appliance events associated with the user.

11. A non-transitory computer readable medium that stores program code for delivery slot allocation for a customer placing an order for goods on a wearable processing device on a wrist of the customer, which when the program code is executed by the wearable processing device, the wearable processing device performs the steps of:
(a) establishing dates and times of a customer's previous deliveries and dates and times associated with one or more electronically recorded activities associated the customer;
(b) calculating, via a probability estimation algorithm included in the program code, candidate delivery slot days and times for delivery of the customer's future order based on the customer's previous deliveries and the one or more electronically recorded activities associated with the customer;
(c) allocating a delivery day of a future order based on a ranking of the delivery slot days;
(d) allocating a delivery time of the future order based on a ranking of the candidate delivery times; and
(e) allocating electronically said day and time delivery slot to the customer's future order based on a selection by the customer through a graphical user interface on the wearable processing device.

* * * * *